United States Patent [19]

Busken

[11] Patent Number: 5,254,356
[45] Date of Patent: Oct. 19, 1993

[54] BAKERY GOODS WITH LIQUID SHORTENING SYSTEM

[75] Inventor: David Busken, Azle, Tex.
[73] Assignee: Bunge Foods Corporation, Bradley, Ill.
[21] Appl. No.: 685,442
[22] Filed: Apr. 15, 1991
[51] Int. Cl.⁵ ............................................. A21D 13/08
[52] U.S. Cl. .................................. 426/553; 426/549; 426/604; 426/611; 426/654; 426/551; 426/552; 426/606
[58] Field of Search ............... 426/549, 604, 611, 654, 426/551, 552, 553, 606

[56] References Cited

U.S. PATENT DOCUMENTS

| | | | |
|---|---|---|---|
| 2,614,937 | 10/1952 | Baur et al. | 99/118 |
| 3,268,337 | 8/1966 | Howard et al. | 426/549 |
| 4,310,556 | 1/1982 | Suggs et al. | 426/654 |
| 4,416,903 | 11/1983 | Cole | 426/549 |
| 4,456,626 | 8/1984 | Nelson et al. | 426/553 |
| 4,477,479 | 10/1984 | Jervis | 426/549 |
| 4,483,880 | 11/1984 | Koizumi et al. | 426/549 |
| 4,650,686 | 3/1987 | Young et al. | 426/321 |
| 4,678,672 | 7/1987 | Dartey et al. | 426/548 |
| 4,680,184 | 7/1987 | Seiden et al. | 426/654 |
| 4,732,767 | 3/1988 | Seiden et al. | 426/94 |
| 4,826,699 | 5/1989 | Soe | 426/564 |

FOREIGN PATENT DOCUMENTS 229938 7/1987 European Pat. Off. .
251020 1/1988 European Pat. Off. .

OTHER PUBLICATIONS

"Emulsifiers for the Baking Industry" Grinsted, undated pp. 15-17, 29, 31 and 39.
"Bakery and Other Starch Products".

*Primary Examiner*—Joseph Golian
*Attorney, Agent, or Firm*—Lockwood, Alex, Fitzgibbon & Cummings

[57] ABSTRACT

A liquid shortening emulsifier system is prepared for incorporation into chemically leavened baking formulations in order to provide baked products exhibiting enhanced moistness, both initially and when subjected to normal storage conditions. The liquid shortening emulsifier system includes, in addition to vegetable oil components, a combination of propylene glycol monoesters and of polycarboxylic acid esters of mono-diglycerides, particularly diacetyl tartaric acid esters of mono-diglycerides, succinic acid esters of mono-diglycerides, and combinations thereof.

7 Claims, No Drawings

BAKERY GOODS WITH LIQUID SHORTENING SYSTEM

BACKGROUND AND DESCRIPTION OF THE INVENTION

This invention relates to a liquid shortening system for bakery goods, baked food products exhibiting enhanced moisture attributes, and a method for preparing such baked food products. More particularly, the shortening system is a liquid composition that imparts advantageous moistness to baked food products such as cakes and other chemically leavened bakery goods, which shortening system includes vegetable oil material as the principal component and combines therewith as emulsifiers both propylene glycol monoesters and polycarboxylic acid esters of monoglycerides such as diacetyl tartaric acid esters of monoglycerides.

It has long been an objective to provide bakery formulations and mixes which, when baked, possess what is considered to be a high level of moistness. Bakery products such as cakes and other chemically leavened products can be considered undesirable when they exhibit a crumbly texture and/or a gritty mouth feel. Mixes for cakes and the like have been offered which are directed toward the objective of enhanced moistness. U.S. Pat. No. 4,456,626 describes a shortening system for cakes which is said to make them moist, light and tender. This shortening system requires substantial quantities of an emulsifier consisting essentially of hydrophilic polyglycerol esters (PGE) and propylene glycol monoesters (PGME), the composition specified in that patent including 2 to 7 times as much PGME as PGE, and relatively high levels of PGME are included within that shortening system. These types of shortening systems which include glycerol and/or glycol esters do not provide all of the attributes desired for chemically leavened bakery items such as cakes.

It has now been determined that, by proceeding in accordance with the present invention, it is possible to provide a liquid shortening system that achieves desired improved moistness and improved keeping qualities for products baked from chemically leavened bakery mixes, particularly for cake products. The liquid shortening system includes a substantial amount of vegetable oil composition together with an amount of propylene glycol monoesters and a lesser amount polycarboxylic acid esters of monoglycerides. This combination enhances the moistness of bakery goods made from a typical baking composition including flour, sugars and/or syrups or other sweetening agents, chemical leavening agents such as baking soda, water and other bakery mix ingredients.

It is a general object of the present invention to provide an improved liquid shortening system for inclusion within batters for making chemically leavened bakery goods, to bakery mixes including such liquid shortening systems, and to baked goods prepared therefrom.

Another object of this invention is to provide a liquid shortening system which is added to a bakery mix, which system includes a combination of emulsifier components that impart enhanced moistness and improved keeping quality to baked chemically leavened items incorporating same.

Another object of this invention is to utilize in an improved shortening system a combination of emulsifiers of the propylene glycol monoester variety and of the polycarboxylic acid esters of mono-diglyceride variety.

Another object of the present invention is to provide an improved liquid shortening system which includes diacetyl tartaric acid esters of monoglycerides.

These and other objects, features and advantages of the present invention will be clearly understood through a consideration of the following detailed description.

DESCRIPTION OF THE PARTICULAR EMBODIMENTS

Compositions for baking products will typically include flour components, sugars and/or other sweetening and flavoring components, milk solids, egg materials, chemical leavening agents such as a baking soda and/or a baking acid, water and shortening. Typically shortenings or shortening systems are fat or oil mixtures of fats and/or oils. The particular type of shortening system discussed herein is one wherein emulsifiers have been added thereto. These baking compositions are then blended together and subjected to baking conditions in a manner well-known in the art.

Concerning these baking compositions, the relative amounts of each component are generally appreciated in the art. Often, the component making up the greatest weight percentage of the baking composition is the sugar and/or syrup component, with flour being somewhat less but being the next largest percentage. Water and eggs are also major components but usually less than the sugar and flour. A typical baking composition will contain between about 10 and about 20 weight percent of the shortening emulsifier system, preferably between about 11 and about 16 weight percent, based on the total weight of the baking composition. The remainder of the components will make up a minor percentage of the baking composition.

With more particular reference to the emulsifier-containing shortening system according to the present invention, the principal component thereof in terms of volume and/or weight is a vegetable oil composition, while emulsifiers make up a minor component and primarily the remainder of the shortening system. A substantial proportion of the vegetable oil composition is a fluid or liquid vegetable oil, and the composition can also include as a minor component a plastic or hardstock fat or oil. Typical vegetable oils in this regard are selected from the naturally occurring liquid triglyceride oils such as soybean oil, canola or rapeseed oil, cottonseed oil, peanut oil, sesame oil, corn oil, sunflower seed oil and the like. Also available are coconut oil, palm oil and the like. The plastic or hard stock component which may be included within the vegetable oil composition will typically be a hydrogenated vegetable oil. Exemplary hardstocks are hydrogenated soybean oil, hydrogenated cottonseed oil and the like.

The vegetable oil composition typically will comprise at least about 85% by weight of the liquid shortening system. Preferably, the vegetable oil composition will make up at least about 904 by weight of the liquid shortening system, and the hardfat will typically make up not more than 5% by weight. The ratio of liquid oil component to hardstock component can vary between about 200:1 to 40:1, preferably between about 100:1 and 70:1.

The emulsifier components included within the liquid shortening system include the combination of propylene glycol monoesters (PGME) and of polycarboxylic acid esters of monoglycerides. Generally speaking, the composition will include a preferred ratio of propylene glycol monoesters to polycarboxylic acid esters of monoglycerides. A typical liquid shortening system according to the invention will include not more than about 10% by weight of propylene glycol monoesters and not more than about 5% by weight of polycarboxylic acid esters of monoglycerides. Preferably, the propylene glycol monoesters are present at a level of not greater than about 8% by weight. All of the weight percents specified herein are based upon the total weight of the liquid shortening system.

With more particular reference to what is meant by the term "propylene glycol monoesters", commercially available propylene glycol monoesters can also include minor amounts of monoglycerides and non-functional components. Typically, commercially available propylene glycol monoester emulsifiers contain between about 60 and about 90% propylene glycol monoesters per se and can include up to about 15% functional monoglycerides. Typically, any remaining components are non-functional in an emulsifier system of the type specified herein. The quantity of actual PGME present in the liquid shortening will be at least about 1.5 weight percent and often not more than about 6.5 weight percent.

The shortening emulsifier system of the invention includes at least one other specific type of emulsifier. More particularly, the shortening emulsifier system also includes polycarboxylic acid esters of monoglycerides. A minimum of 1 weight percent of these mono-diglyceride esters are included within the shortening emulsifier system, and typically not greater than about 5 weight percent, based upon the total weight of the liquid shortening system. The carboxylic acid moieties thereof should have a carbon chain length of at least 4 carbon atoms and typically not more than 12 carbon atoms. Especially preferred are diacetyl tartaric acid esters of monoglycerides and succinic acid esters of mono- and diglycerides. Inclusion of the diacetyl tartaric acid esters of monoglycerides in combination with the PGME is believed to be especially effective in achieving the objectives of the present invention.

It is important that both the propylene glycol monoesters and the polycarboxylic acid esters of mono-diglycerides be included within the liquid shortening system. The ratio of propylene glycol monoesters to the esters of monoglycerides should be between about 0.2 to 1 and about 6 to 1, and preferably between about 0.4 to 1 and about 4 to 1. Generally speaking, it is preferred that the combination of emulsifiers include both propylene glycol monoesters and acetyl tartaric acid esters of monoglycerides. These compositions can also include each of the propylene glycol monoesters, the diacetyl tartaric acid esters of monoglycerides and the succinic acid esters of monoglycerides.

Other functional emulsifiers can be included, typically at generally low levels. Exemplary in this regard are the monoglycerides which are often included within commercial propylene glycol monoester emulsifiers. Other possible components include other monoglycerides and distilled monoglycerides. These additional components will typically be present at levels of not greater than about 5% by weight based upon the total liquid shortening composition weight.

It has been found that liquid shortening emulsifier systems in accordance with this invention result in improved moistness and improved keeping quality of cakes and the like baked from mixes incorporating the liquid shortening emulsifier system. Particular advantages can be realized in baking low-fat or so-called fat-free cakes and other chemically leavened bakery products. The moist quality imparted to the cake will remain even after extended-time storage of cakes or the like baked from mixes including the liquid shortening emulsifier system.

The following examples are illustrative of some of the aspects of the present invention.

EXAMPLE 1

A liquid shortening emulsifier system was prepared by blending together 90% by weight of canola oil, 2% by weight of soybean hardfat, 2.0% by weight of diacetyl tartaric acid esters of monoglycerides, 2.0% by weight of succinic acid esters of monoglycerides, about 2.4% propylene glycol monoesters, about 0.6% monoglycerides, and a minor amount of non-functional components originating primarily from the commercial emulsifier source of the propylene glycol monoesters and monoglycerides.

A quantity of 11.8% by weight of this liquid shortening emulsifier system was blended with the following "normal moistness" cake formulation ingredients: 23.5% by weight of flour, 28% by weight of sugar, 19.4% by weight of water, 13% by weight of eggs, 2.4% by weight of nonfat milk solids, 1.2% by weight of baking powder and 0.7% by weight of salt.

These same cake formulation ingredients were combined with commercial liquid shortenings formulated for baking uses, thereby providing control comparisons. One of the liquid shortening products was similar to POUR 'N BAKE (registered trademark) of Bunge Foods Corporation and was composed of about 85.6% by weight of canola oil, 4% by weight of soybean hardfat, 6% by weight of propylene glycol monoesters, about 1.5% monoglycerides and 0.4% distilled monoglycerides. The other control comparison liquid shortening was FLUID FLEX (trademark) of Durkee Corporation. This liquid shortening is believed to be a blend of lactalated esters of mono and diglycerides.

Cakes baked from each of these three formulations were subjected to taste test panel evaluations. The formulation according to the present invention was found to provide a cake that was judged to be significantly more moist than cakes prepared from each of the two control commercial liquid shortenings.

EXAMPLE 2

Taste test panel evaluations described in connection with Example 1 were also conducted for cakes of the same formulation but including a liquid shortening emulsifier system containing the following components: about 2.4% propylene glycol monoesters; 2.5% diacetyl tartaric acid esters of monoglycerides, and about 0.6% monoglycerides and about 1.5% monoglycerides, together with minor amounts of non-functional components. These cakes were found to exhibit good moistness qualities, although not as superior as those of the Example 1 formulation, but still of significantly improved moistness when compared with the cakes prepared from the batters including each of the two control commercial liquid shortening systems.

EXAMPLE 3

Another liquid shortening emulsifier system was prepared as follows: 91.25% canola oil, 1% hydrogenated soybean hard fat, about 5.4% propylene glycol monoesters, 1.75% diacetyl tartaric acid esters of monoglycerides and about 0.3%. mono- and diglycerides. This liquid shortening emulsifier system was incorporated into two types of commercial layer cake formulas, one being for a rich white cake, and the other being for a yellow cake. Controls were also prepared by baking otherwise identical cakes which incorporated the FLUID FLEX commercial liquid shortening described in Example 1. Taste tests were conducted, and the expert panelists unanimously agreed that the cakes incorporating the liquid shortening emulsifier system of the invention were more moist than the cakes prepared with the control liquid shortening.

EXAMPLE 4

The following liquid shortening emulsifier system was prepared: 91.25% soybean oil, 1% soybean hard fat, about 5.4% propylene glycol monoesters, 1.75% diacetyl tartaric acid esters of monoglycerides, about 0.3% monoglycerides, and minor amounts of non-functional components. This liquid shortening emulsifier system was incorporated into a cake formulation generally regarded as resulting in cakes that are not particularly moist when using other liquid shortening systems. Cakes baked from this formula but including this liquid shortening emulsifier system were found to exhibit noticeably increased moistness. The keeping quality and eating quality also were noticeably improved by the inclusion of this liquid shortening emulsifier system.

EXAMPLE 5

Liquid shortening emulsifier systems were prepared and subjected to taste panel testing, but no control cakes including other types of liquid shortening systems were simultaneously conducted. Cakes were prepared from three different liquid shortening emulsifier systems. The one which was judged to be best overall had the following formulation: 91.25% by weight of canola oil, 1% by weight of soybean hardfat, about 3.6% by weight of propylene glycol monoesters, 1.75% by weight diacetyl tartaric acid esters of monoglycerides, about 0.3% monoglycerides, and minor amounts of non-functional components. The second liquid shortening emulsifier system included 92% by weight of canola oil, 1% by weight of hardfat, about 2.4% by weight of propylene glycol monoesters, 2% succinic acid esters of monoglycerides, about 0.2% monoglycerides, and minor amounts of non-functional components. The third liquid shortening emulsifier system, which seemed to provide cakes that were the least moist of cakes prepared with these three liquid shortening emulsifier systems, had the following formulation: 92% by weight of canola oil, 1% by weight of hard fat, about 2.4% propylene glycol monoesters, 2% diacetyl tartaric acid esters of monoglycerides, about 0.2% monoglycerides, and minor amounts of non-functional components.

It will be understood that the embodiments of the present invention which have been described are illustrative of some of the applications of the principles of the present invention. Numerous modifications may be made by those skilled in the art without departing from the true spirit and scope of the invention as defined in the following claims.

What is claimed is:

1. A method for baking chemically leavened cakes, whereby the chemically leavened cakes are of enhanced moistness, both initially and upon storage, the method comprising:

preparing a baking formulation including cake flour, chemical leavening and flavoring components;

adding to the baking formulation a liquid shortening emulsifier system consisting essentially of a liquid blend of at least about 85% of a liquid vegetable oil composition, between about 1.5 and about 8% of propylene glycol monoester emulsifiers and between about 1% and about 5% of diacetyl tartaric acid esters of monoglycerides, all based upon the total weight of the liquid shortening emulsifier system, wherein the propylene glycol monoester emulsifiers and the diacetyl tartaric acid esters of monoglycerides are at a weight ratio of between about 0.4:1 to about 4:1; and blending the liquid shortening emulsifier system with and into the baking formulation, and baking the resulting blended composition into a cake exhibiting enhanced moistness, both initially and upon storage.

2. The method in accordance with claim 1, wherein the diacetyl tartaric acid esters of monoglycerides are present at about 4% by weight or less, based upon the total weight of the liquid shortening emulsifier system.

3. The method in accordance with claim 1, wherein the propylene glycol monoester emulsifiers are present at about 5% or less based upon the total weight of the liquid shortening emulsifier system.

4. The method in accordance with claim 1, wherein the vegetable oil composition includes a vegetable oil present at a level of at least about 90% by weight based upon the total weight of the liquid shortening emulsifier system.

5. The method in accordance with claim 4, wherein the vegetable oil composition further includes a hardfat component present at a level of not greater than about 5% by weight based upon the total weight of the liquid shortening emulsifier system.

6. The method in accordance with claim 5, wherein the weight ratio of liquid vegetable oil to hardstock is between about 200:1 and about 40:1.

7. Baked food products exhibiting enhanced moistness, both initially and under storage conditions, the baked food products comprising chemically leavened cakes having been baked from a formulation of:

about 80 weight percent or more of cake formulation components including cake flour, flavoring components and chemical leavening agents, based upon the total weight of the cake formulation, and about 20 weight percent or less of a liquid shortening emulsifier system, based upon the total weight of the cake formulation, wherein said liquid shortening emulsifier system consists essentially or a liquid blend of:

at least about 85% of a liquid vegetable oil composition, based upon the total weight of the liquid shortening emulsifier system;

between about 1.5 and about 8% of propylene glycol monoester emulsifiers, based upon the total weight of the liquid shortening emulsifier system;

between about 1% and about 5% of diacetyl tartaric acid esters of monoglycerides, based upon the total weight of the liquid shortening emulsifier system; and the propylene glycol monoester emulsifiers and the diacetyl tartaric acid esters of monoglycerides are at a weight ratio of between about 0.4:1 and about 4:1, whereby the baked cake exhibits enhanced moistness initially and under storage conditions.

* * * * *

UNITED STATES PATENT AND TRADEMARK OFFICE
CERTIFICATE OF CORRECTION

PATENT NO. : 5,254,356
DATED : October 19, 1993
INVENTOR(S) : David Busken

It is certified that error appears in the above-identified patent and that said Letters Patent is hereby corrected as shown below:

On the title page: Item [56]
Under References Cited U.S. Patent Documents, "4,456,626  8/1984" should read --4,456,626  6/1984--.
Col. 2, line 60, "904" should read --90%--.
Col. 3, line 52, "acetyl" should read --diacetyl--.
Col. 6, line51, "or" should read --of--.

Signed and Sealed this

Twelfth Day of July, 1994

Attest:

BRUCE LEHMAN

Attesting Officer        Commissioner of Patents and Trademarks